(12) United States Patent
Raboin

(10) Patent No.: US 9,962,671 B2
(45) Date of Patent: May 8, 2018

(54) CERAMIC CYCLONE FOR FLUID CATALYTIC CRACKING UNIT

(71) Applicant: Total Raffinage Chimie, Courbevoie (FR)

(72) Inventor: Jean-Christophe Raboin, Chaumant sur Tharonne (FR)

(73) Assignee: Total Raffinage Chimie, Courbevoie (FR)

( * ) Notice: Subject to any disclaimer, the term of this patent is extended or adjusted under 35 U.S.C. 154(b) by 0 days. days.

(21) Appl. No.: 15/326,563

(22) PCT Filed: Jul. 23, 2015

(86) PCT No.: PCT/EP2015/066890
§ 371 (c)(1),
(2) Date: Jan. 16, 2017

(87) PCT Pub. No.: WO2016/016087
PCT Pub. Date: Feb. 4, 2016

(65) Prior Publication Data
US 2017/0216804 A1   Aug. 3, 2017

(30) Foreign Application Priority Data
Jul. 28, 2014   (FR) ..................... 14 57251

(51) Int. Cl.
*B01J 8/00*   (2006.01)
*B04C 5/085*   (2006.01)
(Continued)

(52) U.S. Cl.
CPC ............ *B01J 8/0055* (2013.01); *B01D 45/12* (2013.01); *B01J 8/28* (2013.01); *B01J 19/02* (2013.01);
(Continued)

(58) Field of Classification Search
CPC ... B01J 8/0055; B01J 8/28; B01J 19/02; B01J 2219/0218; B01J 2219/0263; B04C 5/085; B01D 45/12; C04B 35/80; C04B 35/806
See application file for complete search history.

(56) References Cited

U.S. PATENT DOCUMENTS 4,275,095 A * 6/1981 Warren .................. D01F 9/127
427/228
2009/0239007 A1   9/2009 Meschke et al.

FOREIGN PATENT DOCUMENTS

BE        639131 A   10/1963
CN    201377787 Y    1/2010
(Continued)

OTHER PUBLICATIONS

International Search Report issued in PCT/EP2015/066890, dated Oct. 9, 2015, 4 pages.

*Primary Examiner* — Lessanework Seifu
(74) *Attorney, Agent, or Firm* — Albert Shung

(57) ABSTRACT

The invention relates to a cyclone (10) for mechanical separation of particles in suspension in a gas, in particular intended for a fluid catalytic cracking unit, said cyclone comprising the following elements:
  a separation chamber (101),
  an inlet duct (102) that opens into the chamber (101),
  a gas outlet duct (103) located in the upper portion of the chamber (101) and
  a particle outlet duct (104) located in the lower portion of the chamber (101), characterized in that each element of the cyclone is made of a ceramic material.
The invention also relates to a fluid catalytic cracking unit equipped with at least one cyclone made of ceramic material.

14 Claims, 2 Drawing Sheets

(51) Int. Cl.
*B01D 45/12* (2006.01)
*B01J 8/28* (2006.01)
*C10G 11/18* (2006.01)
*B01J 19/02* (2006.01)

(52) U.S. Cl.
CPC .............. B04C 5/085 (2013.01); C10G 11/18 (2013.01); *B01J 2208/00752* (2013.01); *B01J 2219/0263* (2013.01)

(56) References Cited

FOREIGN PATENT DOCUMENTS

| | | | |
|---|---|---|---|
| EP | 1054725 | A1 | 11/2000 |
| EP | 1136132 | A2 | 9/2001 |

\* cited by examiner

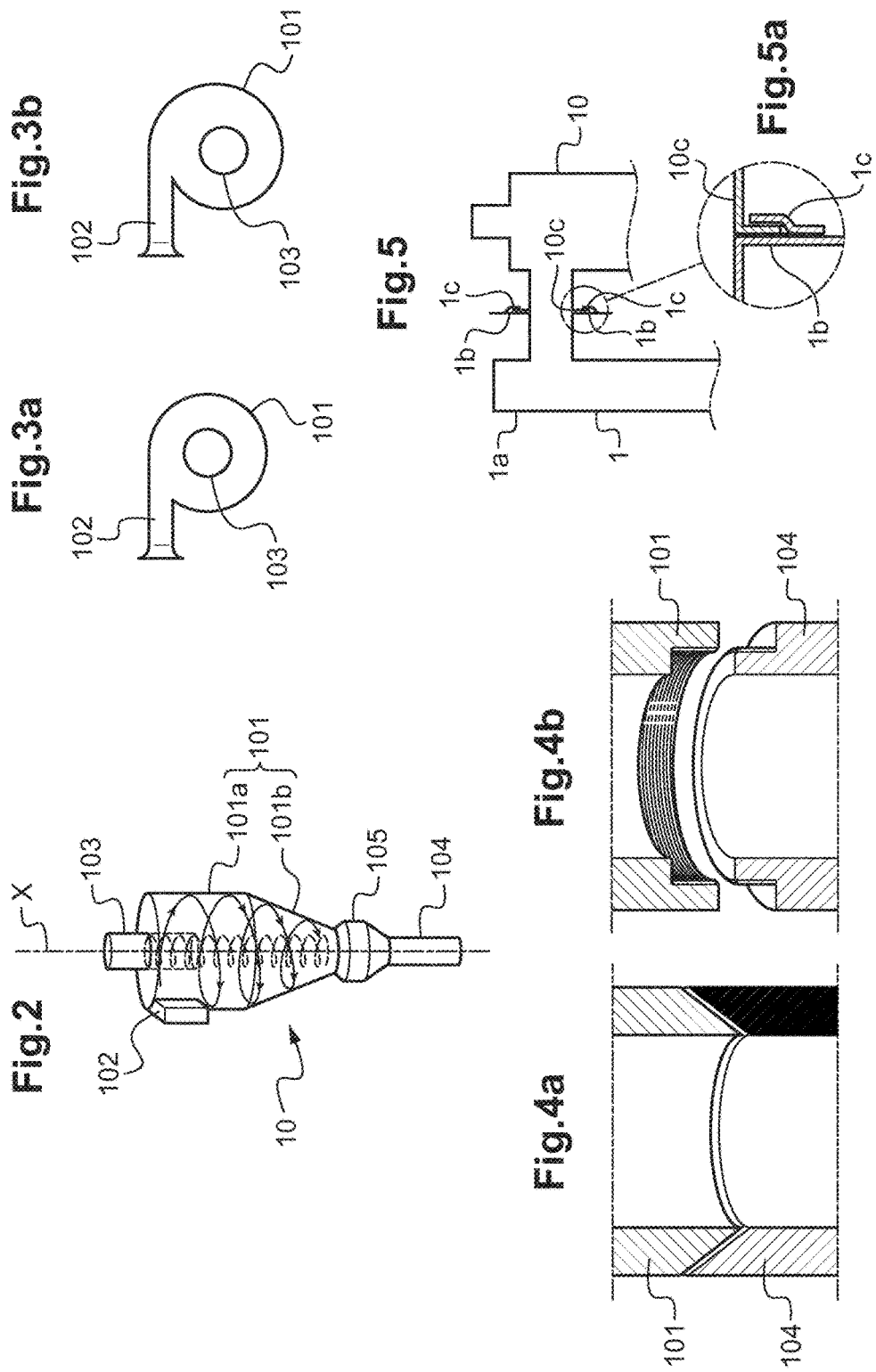

CERAMIC CYCLONE FOR FLUID CATALYTIC CRACKING UNIT

CROSS-REFERENCE TO RELATED APPLICATIONS

This application claims the benefit of PCT/EP2015/066890, filed Jul. 23, 2015, which claims priority from FR 1457251 filed Jul. 28, 2014.

The invention relates to a cyclone of a fluid catalytic cracking (FCC) unit.

In a fluid catalytic cracking unit, the cyclones are used for separating the catalyst particles from the gases circulating in the unit.

The invention relates to the problems of degradation of the metal walls of the internal equipment of a catalytic cracking unit. These degradation problems may be due to erosion caused by the circulation of abrasive catalyst particles within the catalytic cracking unit or to corrosion, owing to the presence of corrosive gases in certain portions of the catalytic cracking unit.

Cyclones are devices that use centrifugal force to carry out a mechanical separation of the particles in suspension in a gas. Cyclones are devices comprising a body, generally essentially cylindroconical, designed to impose a rapid rotation on the gas introduced into the body, for example by making the gas enter tangentially to the circumference of the body, in the vicinity of the wall. Under the effect of centrifugal force, the solid particles taken up in the vortex are moved towards the wall, lose their velocity thereat by friction and fall into the lower portion of the device, before exiting through the apex of the cone. The gas follows the wall until it is in the vicinity of the apex, and once stripped of the particles rises again to the upper portion in order to exit through an opening provided for this purpose. The cyclones used in an FCC unit have metal walls, generally made of stainless steel.

In an FCC unit, the feedstock to be treated and the catalyst are introduced together into a reactor, the temperature of which may achieve several hundreds of degrees centigrade, for example from 520° C. to 550° C. The gaseous effluents exiting the reactor and formed during the chemical reaction are separated from the particles of solid and coked catalyst in a disengager located downstream of the reactor. For this purpose, one or more cyclones are positioned inside the disengager. For example, a disengager may comprise two cyclone stages, the two stages being mounted in series and each comprising a cyclone or several cyclones mounted in parallel. These cyclones are subject to erosion due to the circulation of the catalyst. This erosion is essentially observed on the inner walls of the cyclones, but may also be observed on the outer walls of the cyclones depending on the configuration of the disengager.

The chemical reaction produced in the FCC reactor leads to the formation of deposits of coke on the catalyst particles, requiring a continuous regeneration of this catalyst. The coked and separated catalyst is then transported as a continuous flow to a regenerator in which the coke is burnt off by injection of air. The internal regenerator temperatures used for burning off the coke are of the order of 720 to 760° C. The hot catalyst thus regenerated, which may be classed as a new catalyst, is then reinjected at the inlet of the reactor with the fresh feedstock.

Although the catalyst stripped of its coke is continually discharged at the bottom portion of the regenerator, considerable amounts of solid particles of said catalyst remain entrained at the top outlet of said regenerator by the flue gas. These solid catalyst particles are recovered by means of a suitable device for separating and recovering these particles. For this purpose, at least one stage of cyclones is present in the regenerator, preferably two stages of primary and secondary cyclones installed in series in order to separate and recover the catalyst particles contained in the flue gas. Inside the regenerator, these cyclones undergo a bulk and rapid corrosion by the flue gases. They also undergo erosion caused by the solid particles. It is therefore necessary to protect them in order to lengthen their service life.

The metal walls of the cyclones located in the regenerator or in the disengager are thus covered with a coating intended to protect them mainly from erosion, but also from corrosion. Such coatings generally consist of a composite material, in general a concrete, held by an anchoring structure, which is usually metallic. These anchoring structures are welded to the metal walls and thus provide the attachment of the composite material. They may have a honeycomb shape comprising a plurality of hexagonal cells firmly attached to one another via their sides. The anchoring structure is then welded to the metal wall by welding one portion only of the cells to the metal wall. Each cell is then filled with composite material. This configuration of the coating also makes it possible to ensure the absorption of the differences in expansion that exist between the metal anchoring structure and the composite material.

Such a coating makes it possible to protect the metal walls of the various cyclones of an FCC unit. However, over time a degradation of this coating is observed which may result in fragments of coating falling inside the chambers or cyclones, which may impair the operation of the unit and require it to be shutdown in order to replace the coating.

The degradations observed may have several origins, depending on the operating conditions of the chamber in question.

The disengager or the cyclones located inside the disengager are in contact with the gases resulting from the cracking of the feedstock. These gases get between the interstices of the coating and lead to the formation of coke inside these interstices, and more particularly at the junction of two juxtaposed strips of the anchoring structure. This formation of coke may lead to a significant detachment of the coating during successive cooling/reheating cycles of the chamber containing the cyclones: the gaps that exist between the composite material and its anchoring structure are indeed filled in by the coke so that these shrinkage gaps can no longer play their role that consists in absorbing the differences in expansion between the anchoring structure and the composite material. This results in the formation of compression lines, cracks or even a detachment of the composite material filling the cells of the anchoring structure.

In a regenerator or in the cyclones of a regenerator, the metal walls are in contact with catalyst particles and with a gas containing, amongst others, oxygen, and oxides of carbon, sulphur and nitrogen. This gas penetrates through the interstices of the coating and causes sulphidation, carburization and oxidation phenomena, in particular at the welds that fasten the metal anchoring structure to the metal walls Irrespective of the degradation phenomena observed, corrosion, especially by sulphidation, carburization or oxidation, or formation of coke, the applicant has observed that these phenomena essentially occur at the metal anchoring structure and/or its bonding via welding to the metal walls, and more particularly at juxtaposed strip portions of the anchoring structure that are firmly attached by the fastening means.

In order to reduce the risks of corrosion, anchoring structures of particular shapes have been developed. However, they do not make it possible to be completely free of degradations due to corrosion. Moreover, such coatings must be produced manually and are particularly time-consuming and difficult to install. The maintenance operations are thus long and costly. These coatings also considerably weigh down the metal walls covered: indeed this type of coating has a thickness of around 6 centimeters, which requires the production of metal walls of great thickness, further increasing the overall cost of the equipment. Finally, the shape of the cyclones must be designed as a function of the weight of these coatings and of their method of fastening, but also in order to reduce the risks of erosion. On account of these constraints, it is sometimes not possible to modify the shape of the cyclones in order to improve their ability to separate particles from a gas.

There is therefore a need for cyclones of an FCC unit that have a better resistance to erosion and to corrosion and the maintenance costs of which are lower.

There is also a need for cyclones that have a greater working volume, at a constant overall size, that is to say at a constant external volume.

For this purpose, one subject of the invention relates to a cyclone for mechanical separation of particles in suspension in a gas, in particular intended for a fluid catalytic cracking unit, said cyclone comprising the following elements:
a separation chamber,
an inlet duct that opens into the chamber,
a gas outlet duct located in the upper portion of the chamber and
a particle outlet duct located in the lower portion of the chamber.

According to the invention, each element of the cyclone is made of a ceramic material.

In particular, each element of the cyclone, more specifically the walls of these elements, is without a coating comprising an anchoring structure that defines cells filled with composite material of concrete or cement type, of the type described above.

The cyclone according to the invention has the advantage of being made of ceramic, at least for its main elements, namely the inlet duct, the separation chamber and the gas and particle outlet ducts.

Ceramic materials have proved suitable for the usage conditions of an FCC unit. In particular, these materials may have good corrosion resistance and thermal resistance.

Ceramic materials have a relatively high hardness, greater than the catalysts used in the FCC unit, namely a hardness of at least 1400 N/mm² as Vickers hardness. Preferably, the ceramic material has a hardness of greater than 2100 N/mm² or even greater than 2500 N/mm².

Owing to this relatively high hardness, the cyclone according to the invention has the advantage of not requiring the presence of a protective layer on its walls: it is thus no longer necessary to protect the walls with coatings of the type of those described above for steel walls. The result of this is a considerable weight saving of the cyclone with respect to the steel cyclones customarily used. Owing to the absence of concrete-based protective coating, the risks of pollution of the cracking products by components originating from the degradation of the concrete are also reduced.

The manufacture and the maintenance of the cyclones according to the invention is also facilitated with respect to the steel cyclones covered with a concrete-type coating owing to the absence of coating to be installed or to be repaired/replaced. The maintenance operations may also be spaced out or be shorter, which makes it possible to reduce the operating costs of the FCC unit significantly, knowing that a third of the causes of failure of an FCC unit originate from a degradation of the coating of the cyclones.

Owing to the absence of heavy and bulky coating on the walls of the cyclones according to the invention and owing to the high hardness of these cyclones, it is henceforth possible to design the shape and the dimensions of the cyclones in order to improve their ability to separate particles. The cyclones may thus be smaller. It is also possible to increase the velocities inside cyclones, these velocities being controlled to date in order to limit the abrasion by the particles. This improvement in the separation of the particles makes it possible to reduce the losses of catalyst and therefore to reduce the operating cost of an FCC unit.

Furthermore, since the thickness of the wall of the cyclones made of ceramic is thinner relative to the steel+concrete combination, it is possible to improve the treatment capacity of the FCC unit in question, insofar as the cyclones are a limiting factor for increasing the throughput of the FCC unit.

Moreover, since the cyclones according to the invention may withstand high temperatures, it is thus possible to place them in a regenerator and to operate this regenerator under conditions that risk causing hot spots via an after-burning phenomenon at an undesired spot of the regenerator, such as the inlet or the inside of one of the cyclones. In other words, it is possible to supply the regenerator with any feedstock in order to ensure the thermal balance of the FCC unit, without risk of damaging the cyclones of the regenerator.

The ceramic material may be selected from silicon carbide SiC, boron carbide $B_4C$, silicon nitride $Si_3N_4$, aluminium nitride AlN, boron nitride BN, alumina $Al_2O_3$, or mixtures thereof.

Preferably, the ceramic material is silicon carbide SiC or comprises silicon carbide SiC, preferably in a majority amount, for example in a content of 60% to 99.9% by weight. Silicon carbide has the advantage of possessing good mechanical and physical properties for a reasonable manufacturing cost.

As a variant, or optionally in combination, the ceramic material may comprise a ceramic matrix selected from silicon carbide SiC, boron carbide $B_4C$, silicon nitride $Si_3N_4$, aluminium nitride AlN, alumina $Al_2O_3$, or mixtures thereof, incorporated in which ceramic matrix are carbon fibres or ceramic fibres or a mixture of these fibres.

The ceramic material is then a composite material. Such a composite material may be advantageous for the portions of the cyclone subjected to stretching and shear stresses. In particular, the fibres may be positioned randomly (pseudo-isotropically) or anisotropically. An anisotropic distribution of the fibres may be advantageous in particular zones, for example the end zones intended to be assembled with another material or with another part of the same material (mechanical assembly or welding, brazing) or in the case of zones subjected to a considerable stretching/shear stress (for example cones and drums of cyclones supporting the legs of cyclones). When they are present, these fibres may represent from 0.1% to 10% by weight of the composite material.

The carbon fibres may be carbon fibres with graphite planes oriented along the fibre.

The ceramic fibres may be selected from crystalline alumina fibres, mullite ($3Al_2O_3$, $2SiO_2$) fibres, crystalline or amorphous silicon carbide fibres, zirconia fibres, silica-alumina fibres, or mixtures thereof.

Preferably, the composite ceramic material comprises a silicon carbide SiC matrix comprising fibres of the aforementioned type. Preferably, the fibres are silicon carbide fibres.

Advantageously and non-limitingly, the devices according to the invention are preferably made of CMC materials (CMC=Ceramic Matrix Composite), here identified as CMC devices. In other words, the composite material here above mentioned may be a CMC.

A method of preparation of these CMC devices is preferably performed as follows:
1) Shaping a fibrous ceramic material eventually over a supporting material that could be removed without excessive effort, in order to obtain a fibrous shape that can be assimilated to the backbone of the final device to be obtained, eventually in the presence of a first resin,
2) Coating the shape obtained at step (1) with finely divided ceramic powder and at least a second resin, eventually in the presence of finely divided carbon powder, to obtain a coated shape,
3) Eventually repeat steps (1) and (2),
4) Heating the coated shape of step (2) or (3) under vacuum and/or under inert atmosphere in order to transform the resins of step (1), (2) and eventually (3) into a carbon-rich structure, essentially deprived of other elements to obtain a carbon-rich coated shape,
5) Introducing a gas within the carbon-rich coated shape of step (4) under conditions efficient to transform the carbon-rich structure into carbide containing carbon-rich structure,
6) Eventually removing the supporting material of step (1), when present, wherein carbon fibers are present at least at step (1), (2) and/or (3) within the fibrous ceramic material, within the finely divided ceramic powder, within the finely divided carbon powder, and/or within the first and/or second resin.

Preferably, the mixture of finely divided ceramic powder comprises ceramic fibers with lengths comprised between 100 nm to 5 mm in an amount from 0.1 to 20 Wt % relative to the total amount of finely divided ceramic powder+finely divided carbon powder when present.

Preferably, the fibrous ceramic material is made of non-woven fabric, woven fabric or knit made with at least one of thread, yarn, string, filament, cord, string, bundle, cable, eventually sewed to maintain the desired shape. The fibrous ceramic material and the resins can be present in an amount up to 50 wt % relative to the total amount of components. In these conditions, if a CMC is manufactured with 50 Wt % fibrous ceramic material and resins, and ceramic powder comprising 20 Wt % ceramic fibers is added, the overall content in free fibers, i.e. not contained in the fibrous ceramic material, before any thermal treatment, is 10 Wt %. (Wt %=weight percent).

The fibrous ceramic material is preferably made with carbon and/or silicon carbide fibers.

The first, second and further resin are independently selected among resins able to produce a carbon residue and to bind the different constituents of the ceramic material before thermal treatment. Suitable resins include preferably poly-methacrylic acid, poly methyl methacrylate, poly ethyl methacrylate, polymethacrylonitrile, polycarbonates, polyesters, polyolefins such as polyethylene and polypropylene, polyurethanes, polyamides, polyvinyl butyral, polyoxyethylene, phenolic resins, furfuryl alcohol resins, usual polymer precursors of carbon fibers such as polyacrylonitrile, rayon, petroleum pitch. The resins and their quantities are adjusted to the desired porosity that is obtained after thermal treatment of step (4) and before step (5). Preferably, the total porosity after treatment of step (4) should be comprised between 15 vol % and 25 vol %, more preferably between 20 vol % and 22 vol %. (Vol %=volume percent). Without wishing to be bound by theory, it is assumed the resins, when undergoing thermal treatment of step (4) transform into a network of cavities containing residual carbon atoms surrounded with voids. It is assumed the gas of step (5) moves preferentially within this network thus allowing improved homogeneity in the final CMC material. For example, 78 Wt % SiC powder which contains 0.2 Wt % of silicon carbide fiber is mixed with 17 Wt % phenolic resin and 5 Wt % poly methyl methacrylate and this mixture is used to impregnate and cover a silicon carbide fabric (which accounts for 20 Wt % of the overall weight) that surrounds a shaping support, then heated under inert gas atmosphere until complete carbonization of the resins to obtain a final product having from 16 vol % to 18 vol % total porosity.

The gas may be selected among $SiH_4$, $SiCl_4$, $ZrCl_4$, $TiCl_4$, $BCl_3$, to form corresponding carbide.

Preferred gas is $SiH_4$ or $SiCl_4$.

Preferred conditions of step (5) are standard RCVI conditions (Reactive Chemical Vapor Infiltration), more preferably using pulsed pressure.

Preferably steps (4) and (5) are each independently performed at a temperature comprised between 1100 and 1800° C. and at an absolute pressure comprised between 0.1 and 1 bar.

Preferably, the finely divided ceramic powder comprises, or eventually consists of, particles selected from silicon carbide SiC, boron carbide $B_4C$, silicon nitride $Si_3N_4$, aluminium nitride AlN, boron nitride BN, alumina $Al_2O_3$, or mixtures thereof.

Preferably, the finely divided carbon powder is carbon black.

A suitable but non limiting particle size range for the finely divided ceramic powder, and eventually finely divided carbon powder, is about 10 micrometers or less.

Such a method of preparation allows improved homogeneity in the CMC material in that porosity gradient and clogging at the surface of the material is considerably reduced or totally alleviated, depending on the experimental conditions (low temperatures ca. 1100-1300° C. and reduced pressure ca. 0.1-0.5 bar abs. are preferred).

Advantageously and non-limitingly, the ceramic material may be a sintered ceramic material. This may in particular facilitate the production of elements made of ceramic, whether they are made from one or more portions or whether the cyclone is produced from a single part, which is technically feasible for secondary cyclones which are of small size compared to primary cyclones, and more subject to significant erosion. In absolute terms, it is possible to produce primary cyclones made of a single part, subject to having sintering furnaces of sufficient dimensions.

In one particular embodiment, the elements of the cyclone may form one and the same part made of ceramic material, for example obtained by sintering. The sintering step may be preceded by a conventional shaping step, for example by compression, extrusion or injection.

Sintering is a process for manufacturing parts that consists in heating a powder without melting it. Under the effect of heat, the grains fuse together, which forms the cohesion of the part. Sintering is especially used for obtaining the densification of ceramic materials and has the following advantages:

it makes it possible to control the density of the substance; as a powder is used to start with and since this powder does not melt, it is possible to control the size of the powder grains (particle size) and the density of the material, depending on the degree of initial compacting of the powders;

it makes it possible to obtain materials having a controlled porosity, that are chemically inert (low chemical reactivity and good corrosion resistance) and thermally inert;

it makes it possible to control the dimensions of the parts produced: as there is no change of state, the variations in volume and in dimensions are not very large with respect to melting (absence of shrinkage phenomenon).

In another particular embodiment, the elements of the cyclone may be separate elements made of ceramic material, in particular obtained by sintering, that are assembled together. Such elements may be shaped by moulding or extrusion before the sintering step. They may also be shaped by moulding or by extrusion, followed by a firing of the green injection element, under conventional operating conditions suitable for the type of ceramic produced. The firing step is optionally preceded by a drying step.

Furthermore, each separate element of the cyclone or at least one of the separate elements of the cyclone, may also be made of several portions assembled together. Each portion may in particular be obtained by sintering.

The constituent elements of the cyclone may advantageously be assembled by welding, brazing, screwing, interlocking and combinations thereof. The choice of the assembly technique is made depending on the nature of the ceramic used and depending on the physical constraints withstood by the cyclone elements in question.

Advantageously and non-limitingly, the inner and/or outer walls of the cyclone may be smooth, in other words they may have a low surface roughness. This makes it possible to limit the adhesion of particles to these walls and also enables the reduction of the formation of catalyst fines and therefore a reduction of the catalyst losses and a reduction of the operating costs of an FCC unit. They may also make it possible to reduce the pressure drops and may improve the flexural strength of the portions made of ceramic material.

Such a smooth wall may be obtained when the portions made of ceramic material are made of sintered ceramic material.

Advantageously and non-limitingly, the portions made of ceramic material may be obtained from a relatively fine sintering powder, for example having a mean grain diameter of less than or equal to 500 nm, which may result in relatively smooth surfaces.

Alternatively or in addition, the portions made of ceramic material may be obtained by adding to the main material, for example SiC, an additive selected from boron B, silicon Si and carbon C, or mixtures thereof, for example in a proportion varying from 0.3% to 2% by weight. In the case of an SiC material obtained by powder sintering, such an addition of additive may make it possible to reduce the porosity and consequently the roughness.

Advantageously and non-limitingly, the additive may comprise a mixture of boron B, silicon Si and carbon C. Additional SiC may thus be formed, which blocks the pores and thus reduces the roughness.

Alternatively or in addition, a step of additional deposition of SiC by chemical vapour deposition (CVD) could for example be provided.

The separate elements of the cyclone, and/or the portions forming these elements, may be connected by welding or brazing. The assembling may for example be carried out by a diffusion welding process, for example as described in document US 2009/0239007 A1.

As a variant or in combination, separate elements of the cyclone to be assembled and/or portions forming these elements to be assembled may have ends shaped in order to be assembled by interlocking or screwing.

Advantageously, the ends of the portions or elements assembled by interlocking or screwing may have a conical shape, which may make it possible to simply reduce the stresses between the parts and to improve the leaktightness between the parts.

In general, a cyclone has an axis of symmetry and its various elements are cylindrical or conical. When the cyclone is made of several elements to be assembled, these elements may be sections of the cyclone along its axis of symmetry: each element is then a cone section or cylinder section, and these elements may be assembled by screwing or interlocking of their ends or by welding or brazing.

By way of example, the separation chamber may be produced from a single part with the gas inlet and outlet ducts, the particle outlet duct forming another part. The two parts of the cyclone may be assembled by screwing (their ends to be assembled having rotational symmetry), or interlocking, preferably by cooperation of conical shapes, or by welding or brazing.

It may also be envisaged that the gas inlet and outlet ducts are separate parts assembled with the separation chamber by screwing, their ends to be assembled then having a rotational symmetry, or interlocking, preferably by cooperation of conical shapes, or by welding or brazing.

The invention is not however limited by the shape and number of separate elements to be assembled.

Advantageously, for better leaktightness, a seal may be positioned between the portions or elements assembled by interlocking or screwing. It may be, for example, a seal made of carbon or made any other suitable material, for example made of vermiculite or made of another compressible and thermally stable material. Optionally, a seal may be positioned between portions or elements assembled by interlocking or screwing having a conical shape.

The cyclone according to the invention has the advantage of being made of ceramic material, at least as regards its main elements, namely inlet, separation chamber and gas and particle outlets. It may however be possible to provide the cyclone with an external reinforcement, preferably a light reinforcement in order not to considerably increase the weight of the cyclone.

Advantageously and non-limitingly, at least the separation chamber made of ceramic material may have a reinforcing outer covering in mesh form, for example made of steel. This may make it possible to reduce the thickness of the walls of the chamber without deteriorating the mechanical strength of the chamber.

The invention also relates to a chamber of a fluid catalytic cracking unit comprising, or connected to, at least one cyclone according to the invention.

This chamber may be a regenerator or a disengager of an FCC unit, which contain cyclones.

This chamber may also be a tubular reactor, in particular that in which the catalytic reaction takes place, the end of which, through which the effluents and the spent catalyst particles exit, is connected to the inlet of a cyclone.

In particular, when the chamber forms a tubular reactor made of metal, for example made of steel, in particular made of stainless steel, one end of the tubular reactor may be connected to the inlet duct of a cyclone by fastening means capable of absorbing a difference in expansion between the metal of the reactor and the ceramic material of the cyclone.

For example, such fastening means may be formed by a layer of materials essentially comprising assembled ceramic fibres having a non-zero elastic modulus, this layer being positioned between a portion made of ceramic material and a metal portion and providing the cohesion of these portions.

Alternatively, the geometry and the dimensions of the fastening means may be adapted in order to compensate for the difference in thermal expansion between the metal and the ceramic material.

Such fastening means may comprise portions that interlock or screw together, preferably conical portions. For example, the portions to be assembled advantageously have a rotational symmetry, and their ends have complementary conical shapes.

As a variant, the fastening means may comprise one (or more) pressing element(s) capable of exerting an elastic force on a portion made of ceramic material to be assembled to a metal portion in order to press this portion made of ceramic material against the metal portion.

Thus, the fastening withstands the differential expansion between the material of the metal portion, for example a steel, preferably a stainless steel, and the ceramic material. Indeed, the ceramic may have a coefficient of thermal expansion that is much lower than that of the steel.

The pressing element may for example comprise a spring means, or other means. It might be possible, for example, to provide one or more fastening tabs that are firmly attached to (or form a single part with) a metal portion, for example that are welded. These tabs, on the one hand welded via one end to the metal portion, while the other end rests on a surface of a portion made of ceramic material, make it possible to exert an elastic bearing force on the portion made of ceramic material so as to keep this portion pressed against the metal portion. This other end may have a relatively flat surface in order to limit the zones of high mechanical stresses.

In particular, the fastening means may comprise at least one metal tab firmly attached to a fastening face of the reactor and capable of elastically bearing against an edge of the cyclone in order to keep this edge bearing against the fastening face of the reactor.

As a variant, this chamber that forms a tubular reactor may also be made of ceramic material. Its end may then be connected to the inlet of a cyclone by welding, brazing, screwing or interlocking.

In particular, the ceramic material may be the same as that described with reference to the cyclone according to the invention, the assembling by welding, brazing, screwing or interlocking may be as described with reference to the assembling of a cyclone made of several separate portions.

Finally, the invention also relates to a catalytic cracking unit comprising at least one cyclone according to the invention and/or at least one chamber according to the invention.

The invention is now described with reference to the appended, non-limiting drawings, in which:

FIG. 2 is a cross-sectional schematic representation of a cyclone,

Figure 1:
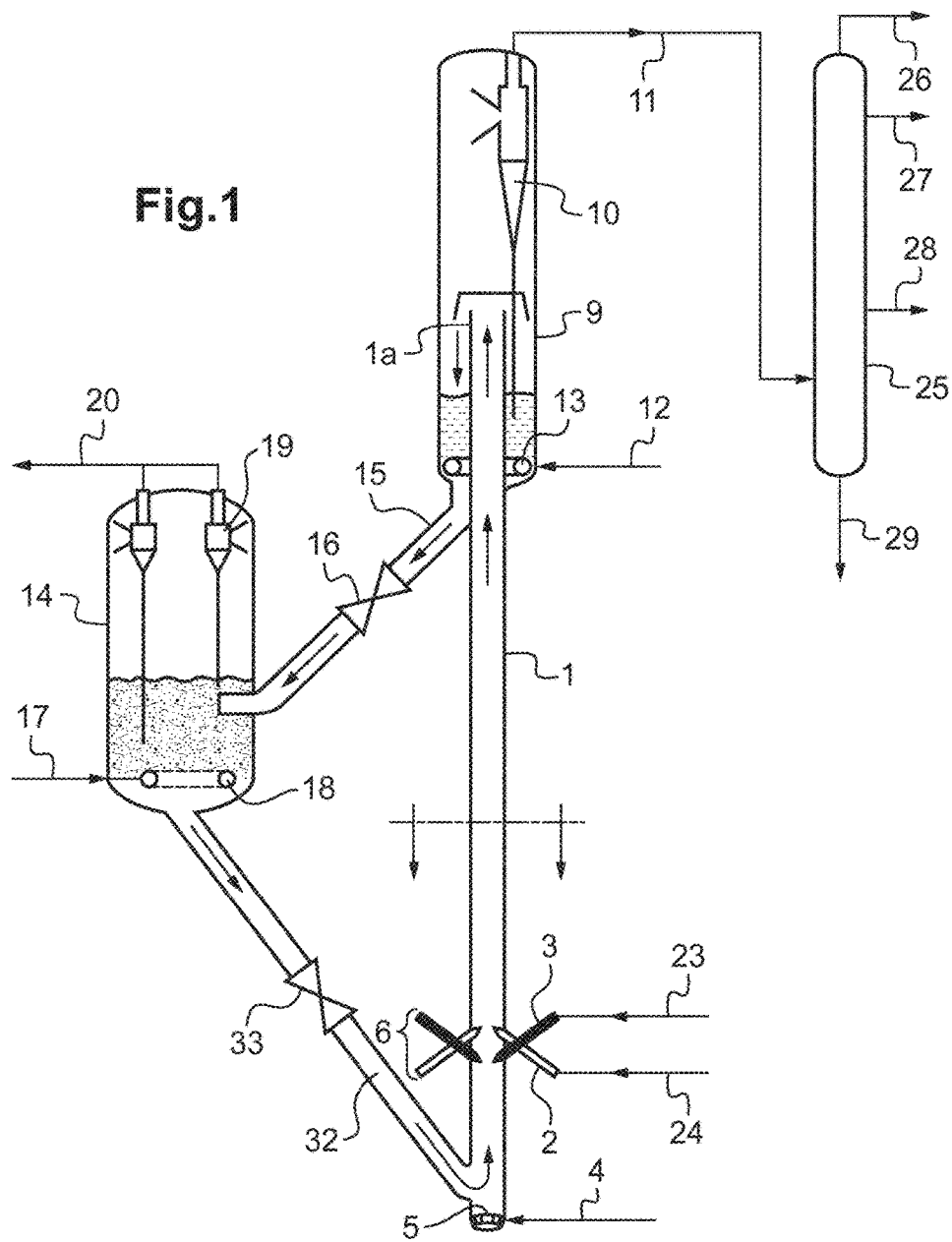
FIG. 1 is a schematic representation of an FCC unit.

FIGS. 3a and 3b are transverse cross-sectional views of two types of cyclone at their inlet duct, FIGS. 4a and 4b are axial cross-sectional views of the ends of two assembled parts. The assembled parts are separated in FIG. 4b for greater clarity, FIG. 5 shows an example of assembling a cyclone according to the invention to a reactor, in particular a metal reactor, FIG. 5a showing a detail from this FIG. 5.

FIG. 1 represents a fluid catalytic cracking unit equipped with an essentially ascending flow riser reactor. This unit is of a type known per se. It comprises in particular a column-shaped reactor 1, referred to as a feedstock riser, or riser, supplied at its base via a duct 32 with regenerated catalyst grains in a determined amount. A riser gas, for example steam, is introduced into the column 1 through the line 4, by means of a diffuser 5.

The feedstock to be cracked is introduced at the injection zone 6, which comprises injectors 2 and 3. The column 1 opens, at its top, into a chamber 9, referred to as a disengager, which is for example concentric with it and in which the separation of the cracking products and the stripping of the deactivated catalyst particles are carried out. The cracking products are separated from the spent catalyst particles in a cyclone 10, which is housed in the chamber 9, at the top of which a line 11 is provided for discharging the cracking products, whilst the deactivated catalyst particles move by gravity towards the base of the chamber 9. A line 12 supplies fluidizing gas injectors or diffusers 13, uniformly arranged at the base of the chamber 9, with stripping fluid, generally steam. One or more other cyclones may be provided inside the chamber 9.

The deactivated catalyst particles thus stripped are discharged at the base of the chamber 9 to a regenerator 14, through a duct 15, along which a control valve 16 is provided. In the regenerator 14, the coke deposited on the catalyst particles is burnt using air, injected at the base of the regenerator via a line 17, which supplies uniformly spaced injectors or diffusers 18. The treated catalyst particles, entrained by the flue gas, are separated by cyclones 19, from which the flue gas is discharged through a line 20, whilst the catalyst particles are discharged to the base of the regenerator 14, from where they are recycled to the feed of the riser 1 via the duct 32, equipped with a control valve 33.

The reaction effluents are transported via the line 11 to a fractionating column 25, which makes it possible to separate them by distillation, in order to obtain:

through the line 26, the gaseous products (C1 to C4 hydrocarbons);

through the line 27, a petrol cut;

through the line 28, a diesel or LCO cut;

and finally, through the line 29, a distillation residue or slurry cut, which contains significant amounts of fines.

The cyclones according to the invention may be placed either in the regenerator 14, or in the disengager 9.

These cyclones 19 and 10 have a similar general structure, only the structure of a cyclone 10 is therefore described.

FIG. 2 schematically represents a cyclone 10 which comprises:

a separation chamber 101, an inlet duct 102 that opens into the chamber 101, a gas outlet duct 103 located in the upper portion of the chamber 101, and a particle outlet duct 104 located in the lower portion of the chamber 101.

The separation chamber 101, generally referred to as the body of the cyclone, is often cylindrical, as represented, or sometimes cylindroconical. In the example represented, the separation chamber 101 comprises a cylindrical upper portion 101a and a conical lower portion 101b.

The lower end of smaller diameter of this conical lower portion 101b is connected to the particle outlet duct 104, which is in the form of a tube extending in the axis of symmetry X of the separation chamber 101. This tube is often referred to as a "dip-leg" or else "leg".

The inlet duct 102 receiving the gas/particle mixture, sometimes also referred to as suction eye or bell mouth, is formed of a tube positioned so as to impart a circular movement to the incoming mixture. Thus, the inlet duct 102 may either be tangential with respect to the separation chamber 101, as represented schematically in FIG. 3a, or be substantially tangential and form a volute, as represented in FIG. 3b.

Under the effect of this movement, the particles present in the gas entering the cyclone fall into the conical lower portion 101b of the separation chamber 101 before being discharged through the particle outlet duct 104. The gas itself exits at the upper end of the cyclone via the gas outlet duct 103, also referred to as a stack. A dust catcher 105 may be positioned between the conical lower portion 101b of the separation chamber 101 and the particle outlet duct 104.

The example described refers to a cyclone that is positioned vertically. The invention is not however limited to such an arrangement, nor to this cyclone structure.

According to the invention, the cyclone 10 is made from one or more parts made of ceramic material.

For example, the separation chamber 101 and the particle outlet duct 104 may be separate parts, it being possible for the inlet duct 102 and the gas outlet duct 103 to be made from one part with the separation chamber 101. For example, it is possible to use the lost wax moulding technique by replacing the wax with salt (for example NaCl), which may be dissolved after a sintering step and the cooling of the part thus produced.

The elements 101 and 104 may then be interlocked, as represented schematically in FIG. 4a by interlocking of conical end portions of complementary shape, or by screwing of their ends (FIG. 4b), or else welded or brazed (not represented). Similarly, the cylindrical upper portion 101a and the conical lower portion 101b of the separation chamber 101 may be separate portions that are assembled, it being possible for this assembling to be carried out as described above, by assembling cylindrical or conical sections, or else by assembling parts resembling bricks by interlocking and/or welding/brazing.

It is also possible to use injection molding or extrusion for the shaping of separate portions. Injection moulding or extrusion are conventionally carried out using ceramic powders or precursors of ceramics with a binder. According to another manufacturing method, the portions made of ceramic material are formed by compression and heating of a ceramic powder, it being possible for the compression to be maintained during the heating step, the heating step being a step of sintering the ceramic powder. This technique is particularly well suited to the manufacture of solid elements made of silicon carbide according to the invention. The ceramic powder used optionally comprises ceramic fibres in order to increase the mechanical strength of the parts produced. The ceramic fibres, when they are present, generally represent from 0.1% to 10% by weight of the part produced.

The inlet duct 102 of the cyclone 10 present in the disengager 9 may be connected directly to the upper end 1a of the tubular reactor 1, as represented schematically in FIG. 5. When this tubular reactor 1 is made of metal, its upper end 1a, of T-shape in the example represented, has a fastening face 1b, firmly attached to which are at least two metal tabs 1c shaped in order to elastically bear against an edge 10c of the cyclone 10 in order to keep this edge 10c bearing against the fastening face 1b of the reactor. This edge 10c may be located at one end of the inlet duct 102 of the cyclone.

As a variant that is not represented, the reactor may also be made of ceramic material and the fastening to the cyclone may then be carried out as described above for the assembling of the elements of the cyclone.

The invention has been described with reference to an FCC unit operating with a riser reactor ("riser"), the cyclones according to the invention may however also be used in FCC units operating with a downer reactor ("downer").

Finally, the cyclones according to the invention may be used in any type of installation requiring the separation of particles in an environment where the temperatures are high, for example (i) in thermal power plants using a fuel that produces solid particles, it being possible for the fuel to be coal, lignite or municipal solid waste, (ii) in cement works, (iii) in metallurgical plants, for example that carry out the refining or extraction of metals.

The invention claimed is:

1. A cyclone for mechanical separation of particles in suspension in a gas, in particular intended for a fluid catalytic cracking unit, said cyclone comprising the following elements:
   a separation chamber,
   an inlet duct that opens into the chamber,
   a gas outlet duct located in the upper portion of the chamber and
   a particle outlet duct located in the lower portion of the chamber, characterized in that each element of the cyclone is made of a ceramic material and the ceramic material comprises a ceramic matrix selected from the group consisting of silicon carbide SiC, boron carbide $B_4C$, silicon nitride $Si_3N_4$, aluminum nitride AlN, boron nitride BN, alumina $Al_2O_3$, and mixtures thereof, wherein the ceramic matrix comprises carbon fibres or ceramic fibres.

2. The cyclone according to claim 1, characterized in that the ceramic fibres are selected from the group consisting of crystalline alumina fibres, mullite fibres, crystalline or amorphous silicon carbide fibres, zirconia fibres, silica-alumina fibres, and mixtures thereof.

3. The cyclone according to claim 1, characterized in that the ceramic material is a sintered ceramic material.

4. The cyclone according to claim 1, characterized in that the ceramic material is a Ceramic Matrix Composite (CMC).

5. The cyclone according to claim 1, characterized in that the elements of the cyclone form one and the same part made of ceramic material.

6. The cyclone according to claim 1, characterized in that the elements of the cyclone are separate elements made of ceramic material that are assembled together, each separate element being made of one part or being made of several portions assembled together.

7. The cyclone according to claim 6, characterized in that the elements and/or the portions are assembled by welding or brazing or in that the elements to be assembled and/or the portions to be assembled have ends shaped in order to be assembled by interlocking or screwing.

8. The cyclone according to claim 1, characterized in that at least the chamber made of ceramic material has a reinforcing outer covering in mesh form, for example made of steel.

9. A chamber of a fluid catalytic cracking unit comprising, or connected to, at least one cyclone according to claim 1.

10. A chamber according to claim 9 forming a metal tubular reactor, characterized in that one end of the tubular reactor is connected to the inlet duct of the cyclone by fastening means suitable for absorbing a difference in expansion between the metal of the reactor and the ceramic material of the cyclone.

11. A chamber according to claim 9 forming a tubular reactor, characterized in that said chamber is made of ceramic material, one end of which is connected to the inlet duct of a cyclone by welding, brazing, screwing or interlocking.

12. A catalytic cracking unit comprising at least one cyclone according to claim 1.

13. The catalytic cracking unit of claim 12, further comprising at least one chamber according to claim 9.

14. A method of making a cyclone made of a ceramic matrix composite (CMC), comprising:

1) shaping a fibrous ceramic material eventually over a supporting material that could be removed without excessive effort, in order to obtain a fibrous shape that can be assimilated to the backbone of the final device to be obtained, eventually in the presence of a first resin, 2) coating the shape obtained at step (1) with finely divided ceramic powder and at least a second resin, eventually in the presence of finely divided carbon powder, to obtain a coated shape, 3) repeat steps (1) and (2), 4) heating the coated shape of step (2) or (3) under vacuum and/or under inert atmosphere in order to transform the resins of step (1), (2) and eventually (3) into a carbon-rich structure, essentially deprived of other elements to obtain a carbon-rich coated shape, 5) introducing a gas within the carbon-rich coated shape of step (4) under conditions efficient to transform the carbon-rich structure into carbide containing carbon-rich structure, 6) eventually removing the supporting material of step (1), when present, wherein carbon fibers are present at least at step (1), (2) and/or (3) within the fibrous ceramic material, within the finely divided ceramic powder, within the finely divided carbon powder, and/or within the first and/or second resin.

* * * * *